United States Patent [19]

Kyle

[11] Patent Number: 4,507,522

[45] Date of Patent: Mar. 26, 1985

[54] TERMINAL ASSEMBLY

[76] Inventor: James C. Kyle, Roseburg, Oreg. 97470

[21] Appl. No.: 284,130

[22] Filed: Jul. 16, 1981

[51] Int. Cl.$^3$ .......................... H01B 17/26; C03C 27/02

[52] U.S. Cl. .......................... 174/152 GM; 65/59.34; 65/59.35

[58] Field of Search ............... 174/50.58, 50.61, 50.63, 174/152 GM; 65/33, 36, 42, 59.1, 59.3, 59.31, 59.34, 59.35, 59.4, 59.5, 59.6; 228/122, 903; 403/28, 29, 30, 179

[56] References Cited

U.S. PATENT DOCUMENTS

| | | | |
|---|---|---|---|
| 516,892 | 3/1894 | Langhans | 174/50.61 X |
| 2,885,826 | 5/1959 | Grieve et al. | 174/152 GM X |
| 3,225,132 | 12/1965 | Baas et al. | 65/59.34 X |
| 3,465,284 | 9/1969 | McManus | 174/50.61 X |
| 3,957,496 | 5/1976 | Eagan | 65/33 |

FOREIGN PATENT DOCUMENTS

| | | | |
|---|---|---|---|
| 1006929 | 10/1965 | United Kingdom | 174/152 GM |

*Primary Examiner*—Laramie E. Askin

*Attorney, Agent, or Firm*—Ellsworth R. Roston; Charles H. Schwartz

[57] ABSTRACT

A hollow sleeve is made from an electrically conductive material and is provided with an integral shelf having at least one hole extending through the shelf. A terminal pin extends through the hole in spaced relationship to the shelf. The terminal pin may be made from the electrically conductive material and may be clad with a noble metal such as platinum. Insulating material extends through the hole in the shelf and hermetically seals the hollow sleeve and the terminal pin. The insulating material may cover the shelf to increase the electrical resistivity between the terminal pin and the sleeve. The electrically conductive material has a coefficient of thermal expansion which increases at a particular rate through an extended range of temperatures with progressive changes in temperature. The insulating material has a coefficient of thermal expansion which increases at approximately the particular rate through the extended range of temperatures with the progressive changes in temperature. The electrically conductive material may be selected from a group consisting of tungsten, titanium, Inconel and stainless steel. The insulating material may be made from boric acid and the oxides of lead, silicon, titanium, zirconium and sodium.

4 Claims, 4 Drawing Figures

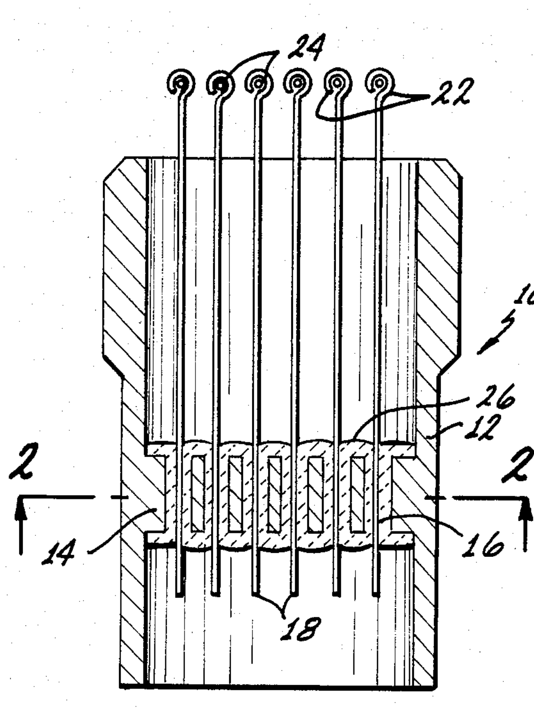
FIG. 1
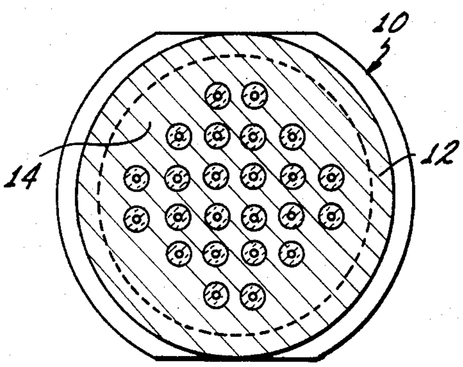
FIG. 2
FIG. 4
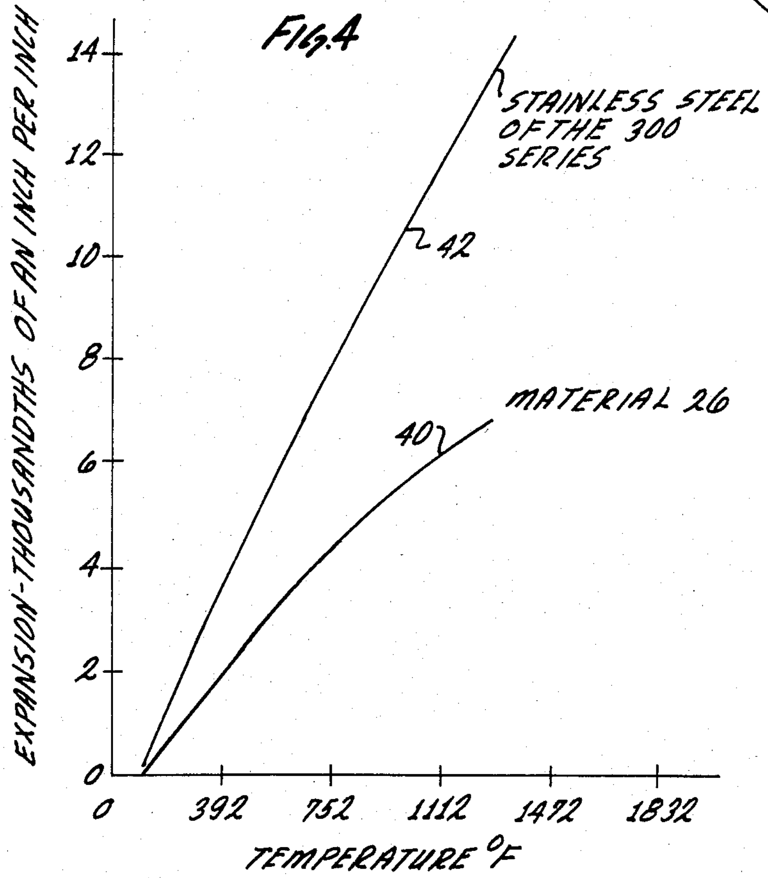
FIG. 3
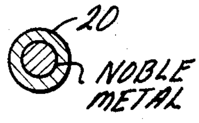

TERMINAL ASSEMBLY

This invention relates to terminal assemblies and more particularly relates terminal assemblies which are hermetically sealed and which remain hermetically sealed throughout an extended range of temperatures.

Many applications require terminal assemblies in which the components in the terminal assemblies are disposed in hermetically sealed relationship. Such terminal assemblies often have to remain hermetically sealed throughout an extended range of temperatures to temperatures considerably in excess of 1000° F. without any degradation of the seals. Furthermore, the terminals in the assemblies have to be constructed and to be provided with characteristics so that electrical leads can be easily and reliably attached to the terminals as by soldering.

A considerable effort has been made for an extended number of years to provide a terminal assembly which will remain hermetically sealed through an extended range of temperatures as high as approximately 1000° F. Such effort has also been made to provide, in such an assembly, terminals which will be constructed to obtain an efficient and reliable attachment of electrical leads to the terminals as by soldering. Such efforts have not been entirely successful.

This invention provides a terminal assembly which meets the objectives discussed above. The terminal assembly provides a hermetic seal through extended ranges of temperatures 1000° F. Furthermore, the terminals in the terminal assembly are constructed for an efficient and reliable attachment of electrical leads to the terminals as by soldering. The terminal assembly is also advantageous because it provides a high electrical resistivity between the different terminals in the assembly and between the terminals and the sleeve housing or supporting the terminals.

In one embodiment of the invention, a hollow sleeve is made from an electrically conductive material and is provided with an integral shelf having one or more holes extending through the shelf. A terminal pin extends individually through each hole in spaced relationship to the shelf. The terminal pin may be made from the electrically conductive material and is clad with a noble metal such as platinum.

Insulating material extends through each hole in the shelf and hermetically seals the hollow sleeve and each terminal pin. The insulating material may cover the shelf along both of the opposite surfaces of the shelf to increase the electrical resistivity between the terminal pins and between the terminal pins and the sleeve.

The electrically conductive material has a coefficient of thermal expansion which increases at a particular rate through an extended range of temperatures, such as a range of temperatures to approximately 1000° F., with progressive changes in temperature. The insulating material has a coefficient of thermal expansion which increases at approximately the particular rate through the extended range of temperatures with the progressive changes in temperature. Because of the provision of approximately the same coefficients of thermal expansion in the electrically conductive material and the insulating material, the hermetic seal in the terminal assembly is maintained without any deterioration through the extended range of temperatures.

The electrically conductive material may be selected from a group consisting of tungsten, titanium, Inconel and stainless steel. The insulating material may be formed from boric acid and the oxides of zirconium, titanium, sodium, lead and silicon.

In the drawings:

FIG. 1 is a sectional view of one embodiment of the invention;

FIG. 2 is a sectional view taken substantially on a line 2—2 in FIG. 1; and FIG. 3 is an enlarged sectional view of one of a terminal pin shown in FIGS. 1 and 2;

FIG. 4 constitutes curves indicating the coefficient of thermal expansion through an extended range of temperatures of different members in the embodiments shown in FIGS. 1 and 2.

In one embodiment of the invention, a terminal assembly generally indicated at 10 is provided. The terminal assembly includes a sleeve 12 made from a suitable material such as Inconel, titanium or stainless steel, preferably of the 300 or 400 series. Inconel is an alloy containing such metals as nickel, cobalt, vanadium and chromium.

The sleeve 12 is provided with a barrel portion and with a shelf 14 which is integral with the sleeve. One or more holes 16 extend through the shelf 14. The holes 16 may have a relatively small diameter such as a diameter as small as 0.075". Terminal pins 18 extend through the holes 16 in spaced relationship to the walls of the shelf 14. The terminal pins 18 may be made from a suitable material such as titanium, Inconel, tungsten or stainless steel, preferably of the 300 or 400 series. The terminal pins 18 may be made from a wire having a number 22, a number 24 or a number 26 size. The terminal pin 18 may be clad with a noble metal 20 (FIG. 3) such as platinum. Each of the terminal pins 18 may be provided with a loop 22 at one end so that an electrical lead 24 can be extended through the loop and attached to the terminal pin as by solder.

Insulating material 26 hermetically seals the terminals pins 18 to the sleeve 12. The insulating material 26 may extend through the holes 16 and may cover the shelf 14 along the opposite surfaces of the shelf. The insulating material 26 may be provided with a high electrical resistivity such as a resistivity in the order $10^{14}$ to $10^{15}$ ohms. By providing the insulating material 26 with such a high resistivity and by covering the opposite surfaces of the shelf 14, the electrical resistivity of the terminal assembly is considerably enhanced since the path of electrical leakage between the terminal pins 18 and between the terminal pins and the sleeve 12 is considerably lengthened.

The insulating material for the insulating layer 26 may be produced as disclosed in a co-pending application Ser No. 214,256 filed by me on Dec. 8, 1980 , for "Insulating Material and Method of Making Material, now U.S. Pat. No. 4,371,588". The insulating material for the layer 26 may have the following composition:

| Material | Range of Percentages by Weight |
|---|---|
| Lead oxide (red lead) | 57–68 |
| Silicon dioxide | 23–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 |

As is well known, silicon dioxide is a common material in glasses and ceramics. Lead oxide provides a considerable control over the melting temperature of the insulating material for the layer 26 and also provides a considerable control over the characteristics of the coefficient of the thermal expansion of the insulating material. The lead oxide also controls the electrical resistivity of the insulating material for the layer 26. The relative percentages of the silicon dioxide and the lead oxide in the insulating material for the layer 26 tend to control the coefficient of thermal expansion of the material so that the changes in the coefficient of the thermal expansion of the material for the layer 26 are matched to those of the members 12 and 18. The matching of such changes in the coefficients of thermal expansion is particularly enhanced because of the relatively high ratio of red lead to silicon dioxide in the insulating material for the layer 26.

Boric acid acts as a glass former. It facilitates the production of at least a partially amorphous state in the insulating material for the layer 26. Sodium carbonate is also a glass former. Since it is actually a powerful glass former, the relatively small amount of soda ash in the insulating material for the layer 26 has a greater effect than the low percentage would indicate. Soda ash is especially helpful in providing the insulating material for the layer 26 with substantially the same changes in the coefficient of thermal expansion as each of the members 12 and 18 when the member is made from a material such as titanium or stainless steel. Zirconium oxide and titanium dioxide are crystallites and insure that the insulating material is at least partially crystalline.

The insulating material for the layer 26 may be formed by mixing the different materials in the particular ranges specified above and heating the mixture to a suitable temperature such as a temperature to approximately 1700° F. The mixture may then be maintained at this temperature for a suitable period of time such as a period to approximately three (3) hours. The material may then be quenched in a suitable liquid such as water and then ground and formed into beads.

The insulating material produced for the layer 26 after the quenching operation is primarily amorphous but partially polycrystalline. The relative proportions in the amorphous and polycrystalline states of the insulating materials for the layer 26 are somewhat independent of the temperatures and periods of time in which the mixture is heated. This is particularly true since the mixture tends to become partially amorphous and partially polycrystalline at the time that the mixture melts. As a result, the mixture may be melted repetitively without affecting simultaneously the properties of the material.

The insulating material for the layer 26 has certain important and desirable properties. It is provided with a high electrical resistance such as a resistance in the order of $10^{14}$ to $10^{15}$ ohms. Its coefficient of thermal expansion also changes at progressive temperatures throughout an extended range (such as a range to approximately 1500° F.) at a rate matching approximately the changes in the coefficient of thermal expansion of the members 12 and 18 throughout such range. This is particularly true when the members 12 and 18 are made from titanium, titanium alloys, Inconel or stainless steels in the 300 or 400 series. Such changes in the coefficients of thermal expansion may be seen from FIG. 4, which illustrates at 40 the coefficient of thermal expansion of the material for the layer 26 and at 42 the coefficient of thermal expansion of the members 12 and 18 when the members are made from stainless steel in the 300 series.

As will be seen in FIG. 4, the changes in the coefficients of thermal expansion of the members 12 and 18, and the material for the layer 26 are matched approximately throughout a range of temperatures to approximately 1500° F. As a result, the material for the layer 26 is able to maintain the hermetic seal with the members 12 and 18 throughout the extended range of temperatures to approximately 1500° F.

As will be appreciated, the compressive force exerted on the member 12 or on the member 18 by the material for the layer 26 is dependent upon the difference in the coefficients of thermal expansion of such material and the members 12 and 18. Since the difference in the coefficients of thermal expansion remains approximately constant with changes in temperature, the compressive forces on the members 12 and 18 exerted by the material for the layer 26 remain approximately constant with such changes in temperature. This facilitates the retention of the hermetic seal between the materials for the layer 26 and the members 12 and 18 with such changes in temperature.

The percentage of the different oxides in the insulating material for the layer 26 may be as follows to provide for an efficient sealing of the material to the members 12 and 18 when the members 12 and 18 are made from stainless steel in the 300 series. For example, the insulating material for the layer 26 may have the following composition:

| Material | Percentage by Weight |
|---|---|
| Lead oxide (red lead) | 64.9 |
| Silicon dioxide | 25.4 |
| Soda ash (sodium carbonate) | 0.5 |
| Titanium dioxide | 3.5 |
| Zirconium oxide | 3.3 |
| Boric acid | 2.4 |

When the insulating material for the layer 26 has the composition specified above, its coefficient of thermal expansion throughout a range of temperatures to approximately 1000° F. changes at a rate which approximates the changes in the coefficient of thermal expansion of stainless steel in the 300 series. For example, the coefficient of thermal expansion of the material for the layer 26 may be approximately $4 \times 10^{-6}$ in/in/°F.

After being stacked between the members 12 and 18, the beads of the material for the layer 26 and the members 12 and 18 are heated to an elevated temperature for a limited period of time. For example, the heating may be provided to a suitable temperature such as approximately 1600° F. for a limited period of time such as a period of approximately thirty (30) minutes to produce the seal between the members 12 and 18 and the insulating material for the layer 26. Such heating simultaneously fuses the insulating material for the layer 26 to the sleeve 12 and the terminal pin 18.

The cladding of the platinum on the terminal 18 offers certain advantages. It facilitates the attachment of the leads 24 to the terminal pins 18 as by solder. In this way, it insures that electrical leads can be attached efficiently and reliably to the terminal pins.

In this way, a terminal assembly is provided in which all of the different members have coefficients of thermal conductivity which change at approximately the same rate with changes in temperature. This assures that a hermetic seal will be maintained throughout an extended range of temperatures. At the same time, the terminal pins are constructed and provided with characteristics to assure that electrical leads can be efficiently and reliably attached to the terminal pins.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a terminal assembly,
a sleeve made from a first electrically conductive material and provided with a barrel portion and with a shelf portion extending across the sleeve and provided with at least one hole,
a pin made from the first electrically conductive material and clad with a noble metal, the pin being disposed through the hole in the shelf portion in spaced relationship to the shelf portion
a ceramic insulating material disposed in the hole and hermetically sealing the pin to the sleeve, the ceramic insulating material being partially amorphous and partially polycrystalline,
the first electrically conductive material having a coefficient of thermal expansion which changes in a particular relationship with progressive changes in temperature and the ceramic insulating material having a coefficient of thermal expansion which changes in approximately the particular relationship with the progressive changes in temperature to temperatures of approximately 1000° F.,
the ceramic insulating material being made from boric acid and oxides of zirconium, titanium, sodium, lead and silicon.

2. In combination in a terminal assembly,
a sleeve made from a first electrically conductive material and provided with a barrel portion and with a shelf portion extending across the sleeve and provided with at least one hole,
a pin made from the first electrically conductive material and clad with a noble metal, the pin being disposed through the hole in the shelf portion in spaced relationship to the shelf portion,
a ceramic insulating material disposed in the hole and hermetically sealing the pin to the sleeve, the ceramic insulating material being partially amorphous and partially polycrystalline,
the first electrically conductive material having a coefficient of thermal expansion which changes in a particular relationship with progressive changes in temperature and the ceramic insulating material having a coefficient of thermal expansion which changes in approximately the particular relationship with the progressive changes in temperature to temperatures of approximately 1000° F.,
the ceramic insulating material having the following composition:

| Materials | Relative Percentage by Weight |
|---|---|
| Zirconium oxide | 3.3 |
| Titanium dioxide | 3.5 |
| Boric acid | 2.4 |
| Sodium carbonate | 0.5 |
| Red lead | 64.9 |
| Silicon dioxide | 25.4 |

3. In the terminal assembly set forth in claim 2,
the sleeve and the pin being made from a metal selected from the group consisting of titanium, tungsten, stainless steel and an alloy containing nickel, cobalt, vanadium and chromium.

4. In the terminal assembly set forth in claim 3,
the noble metal cladding the pin being platinum.

* * * * *